United States Patent
Wada

(10) Patent No.: US 6,684,153 B2
(45) Date of Patent: Jan. 27, 2004

(54) FUEL NATURE JUDGING DEVICE FOR INTERNAL COMBUSTION ENGINE

(75) Inventor: Shuichi Wada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 250 days.

(21) Appl. No.: 09/987,996

(22) Filed: Nov. 16, 2001

(65) Prior Publication Data

US 2002/0177941 A1 Nov. 28, 2002

(30) Foreign Application Priority Data

May 25, 2001 (JP) ........................................ 2001-157284

(51) Int. Cl.$^7$ .............................................. F02D 45/00
(52) U.S. Cl. ........................................ 701/114; 73/116
(58) Field of Search ................ 701/112–114; 73/35.02, 73/116, 117.2; 123/406.3, 406.31, 406.32, 1 A

(56) References Cited

U.S. PATENT DOCUMENTS 5,419,296 A  *  5/1995 Yamaura ..................... 73/116

6,314,944 B1  *  11/2001 Majima ..................... 73/35.02

FOREIGN PATENT DOCUMENTS

| JP | 2000-008941 | 1/2000 | ........... F02D/45/00 |
| JP | 2000-337207 | 12/2000 | ........... F02D/45/00 |

* cited by examiner

Primary Examiner—Andrew M. Dolinar
(74) Attorney, Agent, or Firm—Sughrue Mion, PLLC

(57) ABSTRACT

A fuel nature judging device for an internal combustion engine includes a fuel nature judgment permitting device which determines that fuel nature judgment requirements are satisfied and permits fuel nature judgment when the cooling water temperature at the time of previous engine stop is higher than a reference temperature, when the cooling water temperature is lower than a reference water temperature, and when the deviation of the cooling water temperature from the intake air temperature is less than a reference deviation, a fuel nature judging device for judging fuel nature on the basis of a predetermined engine condition when fuel nature judgment is permitted, and a fuel nature judgment result storing device for storing the judgment result of the fuel nature judging device.

6 Claims, 3 Drawing Sheets

FUEL NATURE JUDGING DEVICE FOR INTERNAL COMBUSTION ENGINE

This application is based on Application No. 2001-157284, filed in Japan on May 25, 2001, the contents of which are hereby incorporated by reference.

BACKGROUND OF THE INVENTION

1. Field of the Invention

This invention relates to a fuel nature judging device for an internal combustion engine for judging the nature of a fuel supplied to an engine (internal combustion engine).

2. Description of the Related Art

Conventionally known fuel control devices include a fuel control device which detects the engine cooling water temperature (engine temperature) at the start of an engine (internal combustion engine) or immediately after the start of the engine to determine the fuel amount at the time of engine start in accordance with the engine temperature, and a fuel control device which determines the fuel amount increase value in accordance with the engine temperature at the start of an engine and which, immediately after the start of the engine, gradually reduces the fuel amount increase value with passage of time.

Apart from this, an ignition timing control device is conventionally known which advances ignition timing with respect to a reference value in accordance with the engine temperature detected immediately after the start of the engine.

Further, among conventionally known idle air amount control devices are an idle air amount control device which determines the air amount at the time of engine start in accordance with the engine temperature at the time of engine start or immediately after the engine start, and an idle air amount control device which determines the increase in air amount in accordance with the engine temperature at the time of engine start and which, immediately after the engine start, gradually reduces the air amount increase value with passage of time.

It is to be noted that in the conventional internal combustion engine control devices as mentioned above, no special consideration is given to the nature of the fuel with respect to fuel amount control, ignition timing control, and idle air amount control. In these conventional control devices, the fuel amount, ignition timing, and idle air amount at the time of engine start or immediately after the engine start are adjusted to a specific fuel nature.

On the other hand, recently, there is a demand for an internal combustion engine capable of always ensuring a stable combustion independently of the nature of the fuel, and there have been proposed various kinds of fuel nature judging devices for indirectly judging the fuel nature.

Specifically, the nature of the fuel constitutes an issue when, for example, a heavy gasoline is used. The heavy gasoline is one having a high distillation temperature and a rather low volatility. Its vapor pressure (RVP) is low, and its specific gravity and octane value are higher than those of a regular gasoline (ordinary gasoline).

However, in terms of standardization, there is no distinction between the heavy gasoline and the ordinary gasoline, and no distinction is made at the time of fuel supply as in the case of high-octane gasoline, regular gasoline, etc.

Thus, it can happen that a heavy gasoline is supplied to a vehicle equipped with an internal combustion engine control device for performing fuel amount control, ignition timing control, and idle air amount control in a manner suitable for the regular gasoline.

When a heavy gasoline is supplied to a vehicle equipped with an internal combustion engine control device adapted for regular gasoline, instability in engine rotating speed at the time of engine start and immediately after the engine start, hesitation on acceleration during running, etc. constitute a problem. Further, it can happen that the engine is incapable of starting or that the engine stalls, with the exhaust emission deteriorating.

It is to be assumed that the cause of the above problems is as follows: the heavy gasoline, which has a low vapor pressure, adheres to the intake pipe to cause a reduction in the amount of fuel actually supplied. Thus, at the time of or immediately after the engine start and when accelerating the engine, the actual air-fuel ratio is increased (i.e., becomes leaner), resulting in defective combustion.

In view of this, various devices have been proposed. For example, Japanese Patent Laid-Open No. 2000-8941 discloses a device which judges the fuel nature on the basis of the rotating speed fluctuation ratio immediately after the engine start, and Japanese Patent Laid-Open No. 2000-337207 discloses a device which judges the fuel nature on the basis of the condition from the engine start to the detection of the initial detonation.

In the fuel nature judging devices as described in the above-mentioned publications, however, when the engine is re-started after repeating one or two times a short-term engine start when the engine temperature is low (in which the engine is stopped after its start at an interval short enough not to cause a rise in the engine cooling water temperature), the fuel adhering to the intake pipe at the previous start is supplied when re-starting the engine. Thus, even when the fuel is a heavy gasoline, the actual air-fuel ratio is temporarily reduced (i.e., becomes rich) to cause a satisfactory combustion, which leads to an erroneous fuel nature judgment (i.e., the fuel is erroneously judged to be an ordinary gasoline).

When the engine temperature is high, the engine load is relatively low, so that even when the fuel is a heavy gasoline and the actual air-fuel ratio is lean, there is no reduction in engine rotating speed, and it is determined that a relatively satisfactory combustion is being effected. Thus, an erroneous judgment is made as to the fuel nature (i.e., the fuel is judged to be an ordinary gasoline).

Further, even in a case in which the cooling water temperature is not so high, when the cooling water temperature is higher than the ambient temperature, the period of time that has elapsed after the engine stop is relatively short. In such a case, the viscosity of the engine oil is low, and the engine load is relatively light, so that even when the fuel is a heavy gasoline and the actual air-fuel ratio is lean, it is determined that a relatively satisfactory combustion is being conducted. Thus, an erroneous fuel nature judgment is made (i.e., the fuel is judged to be an ordinary gasoline).

In the above-described conventional devices, the previous engine operating condition is not taken into consideration when performing fuel nature judgment at the time of and immediately after the engine start, so that when a heavy gasoline is being supplied, an erroneous fuel nature judgment can be made as a result of the satisfactory combustion with a temporarily rich air-fuel ratio due to the residual fuel or the relatively satisfactory combustion at the time of reduced engine load due to engine temperature.

SUMMARY OF THE INVENTION

This invention has been made with a view toward solving the above problem in the prior art. It is accordingly an object of this invention to provide a fuel nature judging device for an internal combustion engine which can prevent erroneous fuel nature judgment due to the previous engine operating condition and prevent erroneous fuel nature judgment when the engine load is light due to the current engine temperature.

In accordance with this invention, there is provided a fuel nature judging device for an internal combustion engine comprising a previous-engine-stop cooling water temperature storing means for storing a cooling water temperature at the time of previous engine start, a previous-engine-stop cooling water comparing means for comparing the cooling water temperature at the time of previous engine start with a first reference temperature, a current engine cooling water temperature comparing means for comparing a current cooling water temperature with a second reference water temperature, a cooling-water-temperature/intake-air-temperature deviation measuring means for measuring a deviation of the current cooling water temperature from a current intake air temperature, a deviation comparing means for comparing the deviation with a reference deviation, a fuel nature judgment permitting means which determines that fuel nature judgment requirements are satisfied and permits fuel nature judgment when the cooling water temperature at the previous engine stop is higher than the first reference temperature, when the cooling water temperature is lower than the second reference water temperature, and when the deviation is less than the reference deviation, a fuel nature judging means for judging fuel nature on the basis of a predetermined engine condition when the fuel nature judgment is permitted, and a fuel nature judgment result storing means for storing a judgment result of the fuel nature judging means.

Further, in this invention, when the cooling water temperature at the time of previous engine stop is not higher than the first reference temperature, when the cooling water temperature is not lower than the second reference water temperature, or when the deviation is not less than the reference deviation, the fuel nature judgment permitting means determines that the fuel nature judgment requirements are not satisfied and does not permit fuel nature judgment, and, in this case, the fuel nature judgment result storing means reads out the result of the previous fuel nature judgment, storing the judgment result again.

Further, in this invention, the cooling water temperature is measured by a cooling water temperature sensor mounted to the engine.

Further, in this invention, the intake air temperature is measured by an intake air temperature sensor mounted to an air cleaner connected to an intake pipe of the engine.

DESCRIPTION OF THE PREFERRED EMBODIMENT

Figure 1:
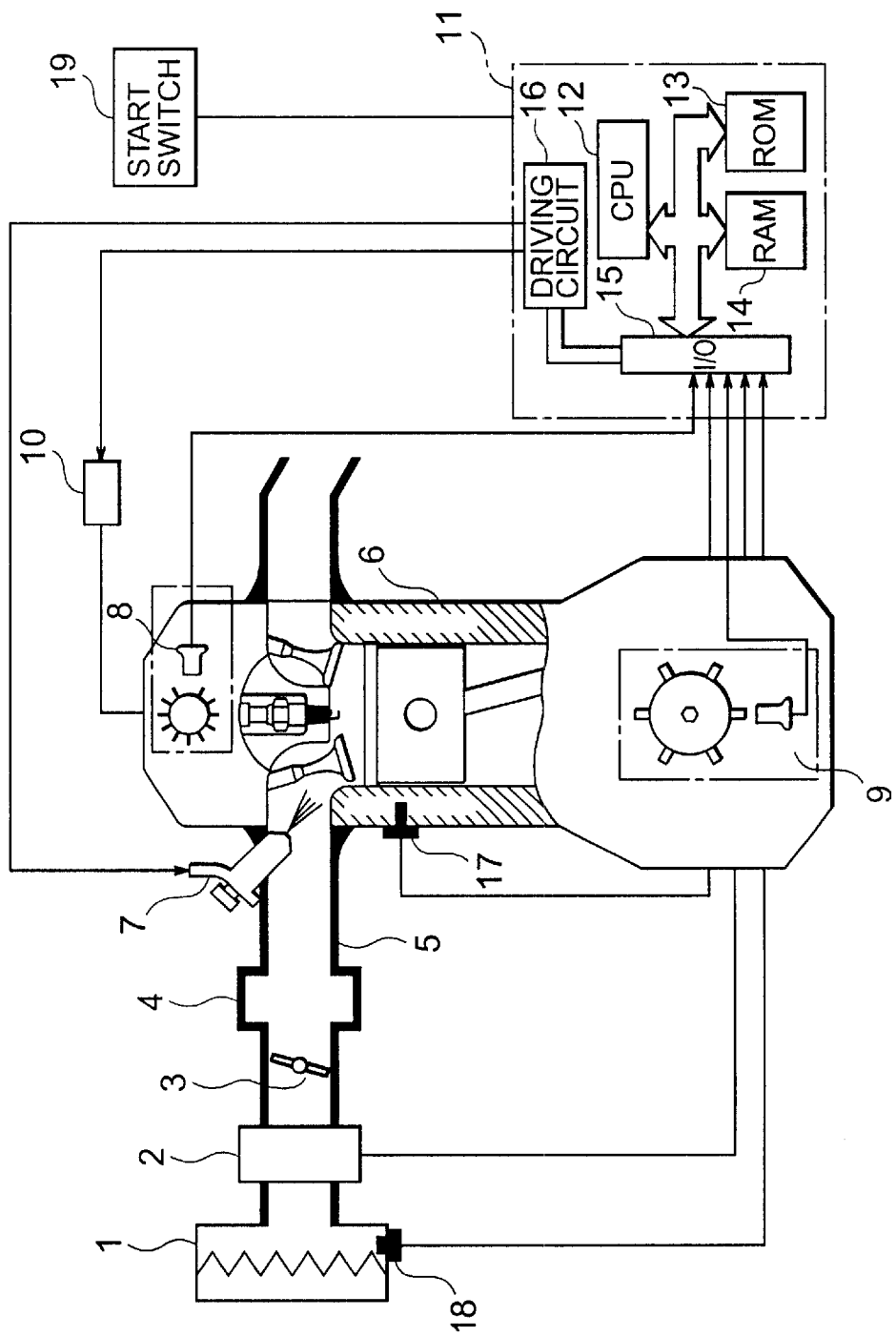
FIG. 1 is a diagram showing the general construction of an electronically controlled internal combustion engine equipped with an internal-combustion-engine fuel nature judging device according to Embodiment 1 of this invention.

A fuel nature judging device for an internal combustion engine according to Embodiment 1 of this invention will be described with reference to the drawings. FIG. 1 is a schematic diagram showing the general construction of an electronically controlled internal combustion engine equipped with an internal-combustion-engine fuel nature judging device according to Embodiment 1 of this invention. In the accompanying drawings, the same reference numerals indicate the same or equivalent components.

In FIG. 1, numeral 1 indicates an air cleaner, numeral 2 indicates an airflow sensor, numeral 3 indicates a throttle valve, numeral 4 indicates a surge tank, numeral 5 indicates an intake pipe, numeral 6 indicates an engine (internal combustion engine), numeral 7 indicates an injector, numeral 8 indicates a cam angle sensor, and numeral 9 indicates a crank angle sensor.

Further, in the drawing, numeral 10 indicates an ignition system, numeral 11 indicates an engine control unit, numeral 12 indicates a CPU, numeral 13 indicates a ROM, numeral 14 indicates a RAM, numeral 15 indicates an interface (I/O), numeral 16 indicates a driving circuit, numeral 17 indicates a cooling water temperature sensor, numeral 18 indicates an intake air temperature sensor, and numeral 19 indicates a start switch.

In FIG. 1, air is taken in through the air cleaner 1 for filtering air, and the intake air amount Qa is measured by the airflow sensor 2 connected to the air cleaner 1. The intake air amount is controlled in correspondence with the load by the throttle valve 3, and the air is sucked in by each cylinder of the engine 6 through the surge tank 4 and the intake pipe 5. On the other hand, the fuel is injected into the intake pipe 5 through the injector 7, and ignition is effected in the engine 6 by the ignition system 10 consisting of an ignition coil, etc.

The engine control unit 11 performs fuel nature judgment, fuel amount control, ignition timing control, idle air amount control, etc. on the basis of the engine reference angle and the engine rotating speed Ne measured by the cam angle sensor 8 mounted to the cam shaft (not shown) of the engine 6, the intake air temperature measured by the intake air temperature sensor 18 mounted to the air cleaner 1, the cooling water temperature measured by the cooling water temperature sensor 17 mounted to the engine 6, and the operating state information such as information on the state of the starting of the engine 6 by the start switch 19.

Further, the engine control unit 11 is formed by a microcomputer consisting of the CPU 12, the ROM 13, the RAM 14, etc., and input thereto through the input/output interface 15 are the intake air amount Qa measured by the airflow sensor 2, the reference angle and the engine rotating speed Ne measured by the cam angle sensor 8, the intake air temperature THA measured by the intake air temperature sensor 18, and the cooling water temperature THW measured by the cooling water temperature sensor 17.

The CPU 12 performs fuel amount computation, ignition timing computation, idle air amount computation, etc. in accordance with the operating state information and on the basis of a control program and various maps stored in the ROM 13, and various kinds of variable data stored in the RAM 14, and drives the ignition system 10, the injector 7, etc. through the input/output interface 15 and the driving circuit 16.

Added to the engine control unit 11 is a backup RAM mechanism which continues to store the storage data of the RAM 14 after the ignition switch is turned off.

Next, the operation of the fuel nature judging device for an internal combustion engine of Embodiment 1 will be described with reference to the drawings.

Figure 2:
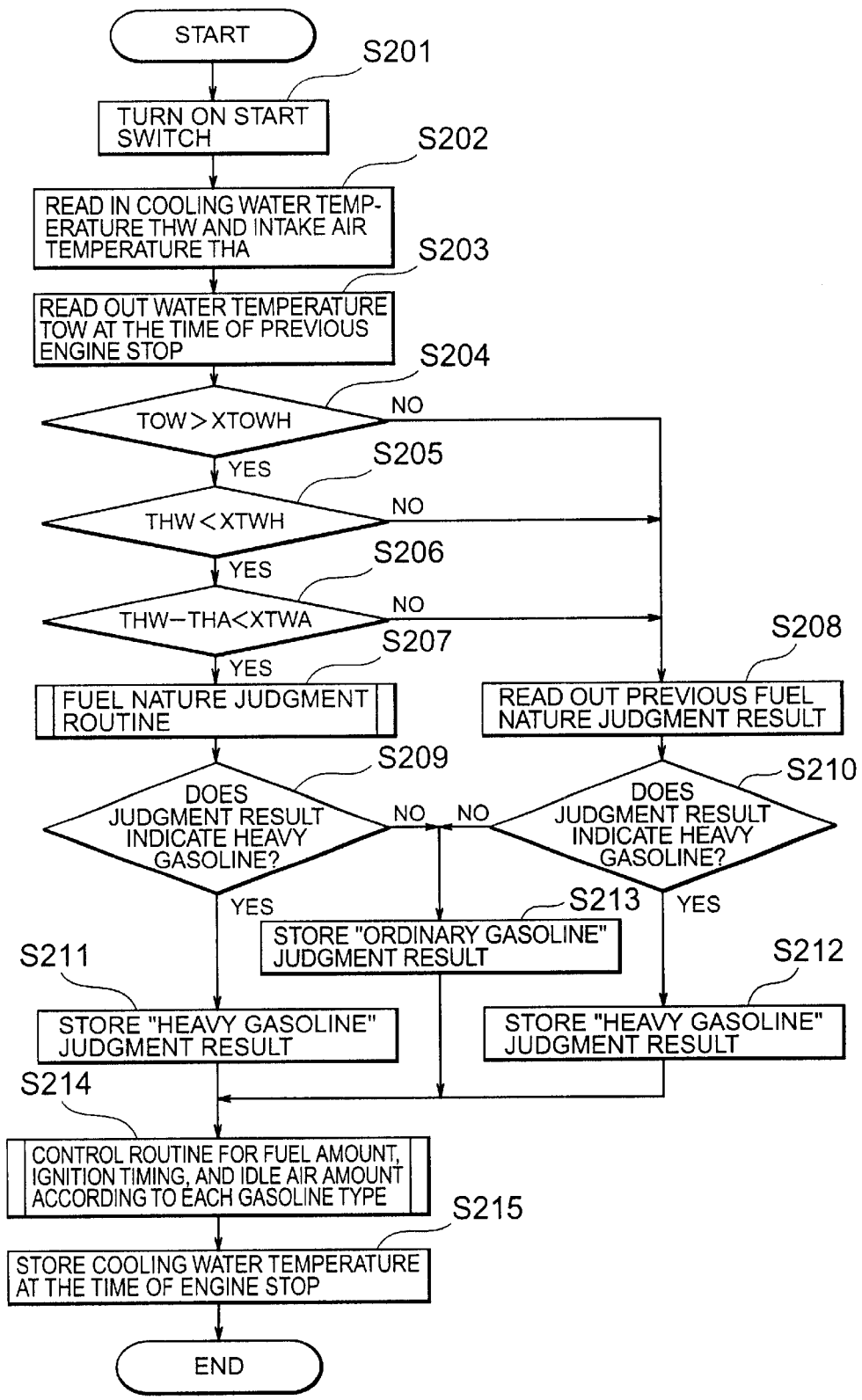
FIG. 2 is a flowchart showing the operation of the internal-combustion-engine fuel nature judging device according to Embodiment 1 of this invention.
Figure 3:
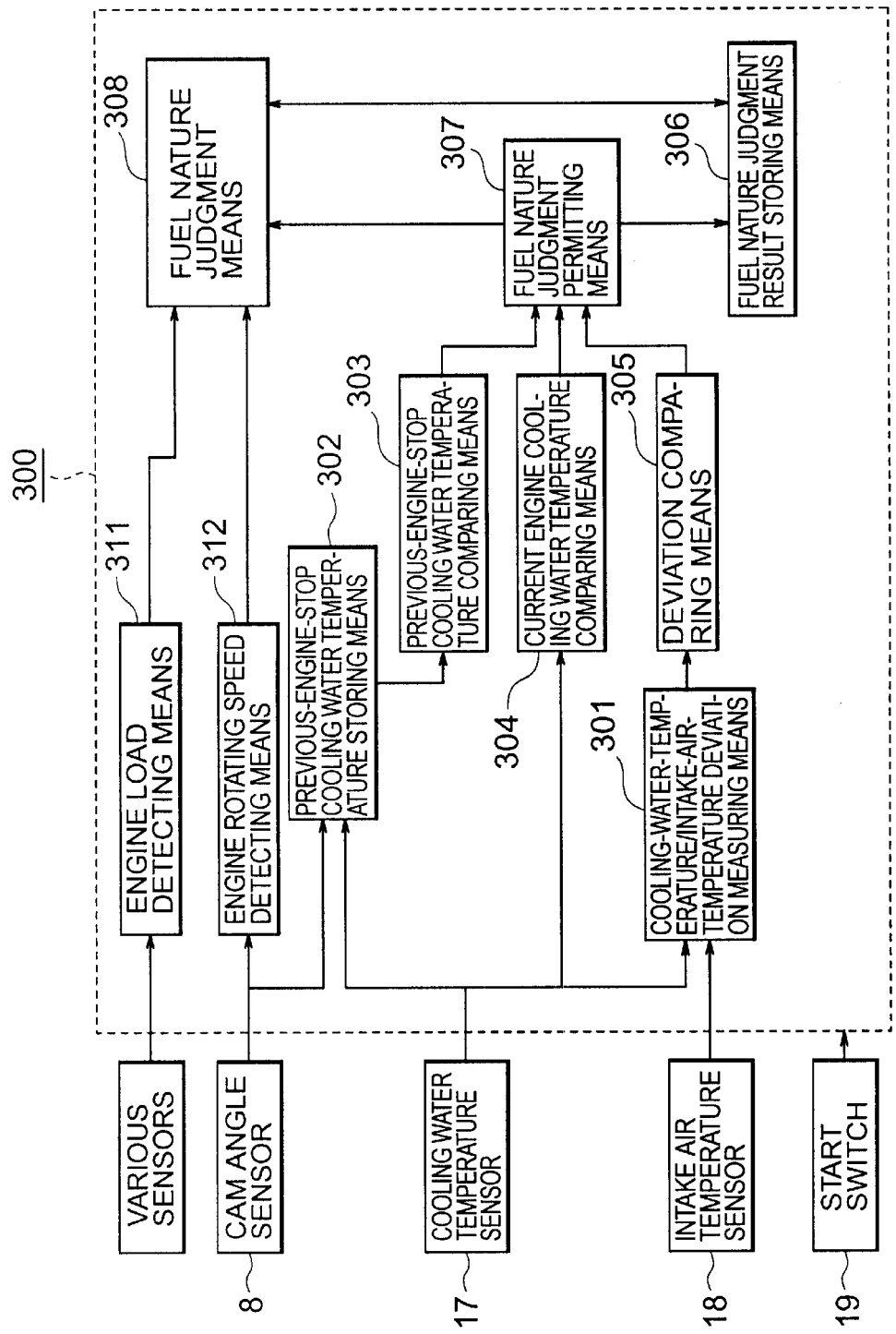
FIG. 3 is a functional block diagram showing the internal-combustion-engine fuel nature judging device according to Embodiment 1 of this invention.

FIG. 2 is a flowchart showing the operation of the fuel nature judging device for an internal combustion engine of Embodiment 1 of this invention. FIG. 3 is a functional block diagram showing the fuel nature judging device for an internal combustion engine of Embodiment 1 of this invention.

In FIG. 2, the start switch (ignition switch) 19 is first turned on (step S201). Then, a fuel nature judging device 300 in the engine control unit 11 is started to execute the following operational flow.

First, the fuel nature judging device 300 reads in the cooling water temperature THW and the intake air temperature THA (step S202), and reads out the cooling water temperature TOW at the previous engine stop from the RAM 14 in which TOW is stored by the previous-engine-stop cooling water temperature storing means 302 using the backup RAM mechanism (step S203).

Subsequently, a judgment is made by a previous-engine-stop cooling water temperature comparing means 303 as to whether the cooling water temperature TOW at the previous engine stop is higher than a reference temperature XTOWH (step S204). When the cooling water temperature TOW at the previous engine stop is lower than the reference temperature XTOWH (that is, when the answer in this step is NO), it is determined that the fuel nature judgment requirements are not satisfied, and the procedure advances to step S208. On the other hand, when the cooling water temperature TOW at the previous engine stop is higher than the reference temperature XTOWH (that is, when the answer in this step is YES), the procedure advances to step S205.

In step S205, a judgment is made by a current engine cooling water temperature comparing means 304 as to whether the current cooling water temperature THW is lower than a reference water temperature XTWH. When the cooling water temperature THW is higher than the reference water temperature XTWH (that is, when the answer in this step is NO), it is determined that the fuel nature judgment requirements are not satisfied, and the procedure advances to step S208. On the other hand, when the cooling water temperature THW is lower than the reference water temperature XTWH (that is, when the answer in this step is YES), the procedure advances to step S206.

In step S206, to make a judgment as to whether a sufficient length of time has elapsed since the previous engine stop to allow the engine to be cooled to the ambient temperature, a judgment is made by a cooling-water-temperature/intake-air-temperature deviation measuring means 301 and a deviation comparing means 305 as to whether the deviation of the current cooling water temperature THW from the current intake air temperature THA, (THW−THA), is smaller than a reference deviation XTWA. When the deviation (THW−THA) is larger than the reference deviation XTWA (that is, when the answer in this step is NO), it is determined that the fuel nature judgment requirements are not satisfied, and the procedure advances to step S208. On the other hand, when the deviation (THW−THA) is smaller than the reference deviation XTWA (that is, when the answer in this step is YES), it is determined that the fuel nature judgment requirements are satisfied and a fuel nature judgment permitting means 307 permits fuel nature judgment, the procedure advancing to step S207.

In step S207, the fuel nature is judged by a fuel nature judgment routine(fuel nature judging means 308). Though not shown, this fuel nature judgment routine judges the fuel nature on the basis of the rotating speed fluctuation ratio immediately after the engine start obtained by processing signals from an engine load detecting means 311 and an engine rotating speed detecting means 312 by the fuel nature judging means 308 as disclosed, for example, in Japanese Patent Application Laid-Open No. 8941/2000, or judges the fuel nature on the basis of the condition from the engine start to the detection of the initial detonation at the engine start obtained by processing signals from the engine load detecting means 311 and the engine rotating speed detecting means 312 by the fuel nature judging means 308 as disclosed in Japanese Patent Application Laid-Open No. 337207/2000.

Next, in step S209, the result obtained by the fuel nature judgment routine is judged. When the judgment result indicates a heavy gasoline (that is, when the answer in this step is YES), the procedure advances to step S211, and the "heavy gasoline" judgment result is stored in the RAM 14 by the fuel nature judgment result storing means 306. On the other hand, when the judgment result indicates a gasoline that is not heavy (that is, when the answer in this step is NO), the procedure advances to step S213, and the "ordinary gasoline" judgment result is stored in the RAM 14.

As described above, when the fuel nature judgment requirements are not satisfied, fuel nature judgment is not permitted by the fuel nature judgment permitting means 307, and the procedure advances to step S208. In step S208, the previous fuel nature judgment result, which is stored in the RAM 14 by the fuel nature judgment result storing means 306 by using the backup RAM mechanism, is read from the RAM 14.

In step S210, the previous fuel nature judgment result read is judged. When the judgment result indicates a heavy gasoline (that is, when the answer in this step is YES), the procedure advances to step S212, and the "heavy gasoline" judgment result is stored in the RAM 14. On the other hand, when the judgment result indicates a gasoline that is not heavy (that is, when the answer in this step is NO), the procedure advances to step S213, and the "ordinary gasoline" judgment result is stored in the RAM 14.

Next, in step S214, the fuel amount, ignition timing, and idle air amount are controlled on the basis of the result obtained by the fuel nature judging device 300 of Embodiment 1. For example, when the judgment result stored in the fuel nature judgment result storing means 306 indicates a heavy gasoline, control is performed so as to increase the fuel amount, advance ignition timing, and increase the idle air amount.

Finally, in step S215, the cooling water temperature at the time of engine stop is stored in the RAM 14 by the previous engine stop cooling water temperature storing means 302, thereby completing this routine.

As described above, in accordance with Embodiment 1, when judging the fuel nature at the time of engine start and immediately after the engine start, the previous engine operating state is taken into consideration and, further, the time that has elapsed from the previous engine stop to the re-starting of the engine is taken into consideration, so that there is no danger of a heavy gasoline being erroneously judged to be an ordinary gasoline as a result of a relatively satisfactory combustion at a temporarily rich air-fuel ratio due to residual fuel in the intake pipe 5 or a relatively satisfactory combustion with a reduced engine load due to engine temperature.

What is claimed is:

1. A fuel nature judging device for an internal combustion engine, comprising:
   a previous-engine-stop cooling water temperature storing means for storing a cooling water temperature at the time of previous engine stop, a previous-engine-stop cooling water temperature comparing means for comparing the cooling water temperature at the time of previous engine stop with a first reference temperature, a current engine cooling water temperature comparing means for comparing a current cooling water temperature with a second reference water temperature, a cooling-water-temperature/intake-air-temperature deviation measuring means for measuring a deviation of the current cooling water temperature from a current intake air temperature, a deviation comparing means for comparing the deviation with a reference deviation, a fuel nature judgment permitting means which determines that fuel nature judgment requirements are satisfied and permits fuel nature judgment when the cooling water temperature at the time of previous engine stop is higher than the first reference temperature, when the cooling water temperature is lower than the second reference water temperature, and when the deviation is less than the reference deviation, a fuel nature judging means for judging fuel nature on the basis of a predetermined engine condition when fuel nature judgment is permitted, and a fuel nature judgment result storing means for storing a judgment result of the fuel nature judging means.

2. A fuel nature judging device for an internal combustion engine according to claim 1, wherein, when the cooling water temperature at the time of previous engine stop is not higher than the first reference temperature, when the cooling water temperature is not lower than the second reference water temperature, or when the deviation is not less than the reference deviation, the fuel nature judgment permitting means determines that the fuel nature judgment requirements are not satisfied and does not permit fuel nature judgment, and wherein the fuel nature judgment result storing means reads the result of the previous fuel nature judgment, storing the judgment result again.

3. A fuel nature judging device for an internal combustion engine according to claim 1, wherein the cooling water temperature is measured by a cooling water temperature sensor mounted to the engine.

4. A fuel nature judging device for an internal combustion engine according to claim 1, wherein the intake air temperature is measured by an intake air temperature sensor mounted to an air cleaner connected to an intake pipe of the engine.

5. A fuel nature judging device for an internal combustion engine according to claim 2, wherein the cooling water temperature is measured by a cooling water temperature sensor mounted to the engine.

6. A fuel nature judging device for an internal combustion engine according to claim 2, wherein the intake air temperature is measured by an intake air temperature sensor mounted to an air cleaner connected to an intake pipe of the engine.

* * * * *